US009508291B2

(12) United States Patent
Tanaka et al.

(10) Patent No.: US 9,508,291 B2
(45) Date of Patent: Nov. 29, 2016

(54) IMAGE DISPLAY APPARATUS

(71) Applicant: PANASONIC CORPORATION, Osaka (JP)

(72) Inventors: Yasuhiro Tanaka, Hyogo (JP); Katsuhiko Hayashi, Nara (JP); Masahiro Kasano, Osaka (JP); Kouki Ichihashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 761 days.

(21) Appl. No.: 13/728,675

(22) Filed: Dec. 27, 2012

(65) Prior Publication Data
US 2013/0169704 A1    Jul. 4, 2013

(30) Foreign Application Priority Data

Dec. 28, 2011 (JP) ................................. 2011-288971

(51) Int. Cl.
| *G09G 3/34* | (2006.01) |
| *G02B 27/22* | (2006.01) |
| *H04N 13/04* | (2006.01) |
| *G02F 1/29* | (2006.01) |

(52) U.S. Cl.
CPC ......... *G09G 3/3406* (2013.01); *G02B 27/2214* (2013.01); *G02B 27/2264* (2013.01); *H04N 13/0418* (2013.01); *H04N 13/0468* (2013.01); *G02F 1/29* (2013.01)

(58) Field of Classification Search
CPC combination set(s) only.
See application file for complete search history.

(56) References Cited

U.S. PATENT DOCUMENTS

| 4,690,515 A | * | 9/1987 | Nakajima et al. | ............ 359/650 |
| 4,921,318 A | * | 5/1990 | Szumski | ....................... 359/356 |
| 2010/0157026 A1 | | 6/2010 | Reichelt | |
| 2011/0096032 A1 | * | 4/2011 | Nakanishi | ..................... 345/175 |

FOREIGN PATENT DOCUMENTS

JP          2010-529485 A       8/2010

* cited by examiner

*Primary Examiner* — Stephen F Husar
*Assistant Examiner* — Danielle Allen
(74) *Attorney, Agent, or Firm* — McDermott Will & Emery LLP

(57) ABSTRACT

An image display apparatus according to the present disclosure includes: an image display panel; a backlight device; a first optical element located between the image display panel and the backlight device and configured to deflect a light incident thereon; a second optical element located between the first optical element and the image display panel and configured to change a deflection angle of emitted light according to a voltage applied thereto; a plurality of first lenses located between the first optical element and the backlight device; a plurality of second lenses located between the second optical element and the image display panel; a position detection section configured to detect a viewing position of a viewer; and a control section configured to control the voltage applied to the second optical element, according to the detected viewing position. The first lenses and the second lenses constitute an afocal optical system.

10 Claims, 7 Drawing Sheets

IMAGE DISPLAY APPARATUS

CROSS REFERENCE TO RELATED APPLICATION

The disclosure of Japanese Patent Application No. 2011-288971, filed on Dec. 28, 2011, is incorporated herein by reference.

BACKGROUND

1. Field

The present disclosure relates to an image display apparatus for displaying an image, such as a liquid crystal display.

2. Description of the Related Art

In recent years, image display apparatuses capable of displaying stereoscopic images have been popularized. For example, Japanese Laid-Open Patent Publication No. 2010-529485 discloses an automatic stereoscopic display that causes images to be stereoscopically viewed by alternately providing light of an image for right eye and light of an image for left eye to the eyes of multiple observers, respectively. In the apparatus disclosed in Japanese Laid-Open Patent Publication No. 2010-529485, a refraction state of light is changed by a deflection means so as to follow the eye positions of the observers. The deflection means is composed of electrowetting cells containing two types of immiscible liquids. When a voltage is applied to the electrowetting cells, the interface between the liquids is changed, whereby a prism function is realized by the electrowetting cells.

SUMMARY

The present disclosure provides an image display apparatus that can control a light-converged position so as to follow the position of a viewer and has a wide range where the light-converged position follows, as compared to the case where only a liquid crystal prism element is used.

An image display apparatus according to the present disclosure includes: an image display panel; a backlight device located on a back surface side of the image display panel; a first optical element located between the image display panel and the backlight device and configured to deflect a light incident thereon; a second optical element located between the first optical element and the image display panel and configured to further deflect the light deflected by the first optical element and to change a deflection angle of emitted light according to a voltage applied thereto; a plurality of first lenses located between the first optical element and the backlight device; a plurality of second lenses located between the second optical element and the image display panel; a position detection section configured to detect a viewing position of a viewer; and a control section configured to control the voltage applied to the second optical element, according to the viewing position detected by the position detection section. The first lenses and the second lenses constitute an afocal optical system.

The present disclosure is effective for realizing an image display apparatus having a wide range where a light-converged position follows, by using the first optical element, the second optical element, and the afocal optical system in combination.

DETAILED DESCRIPTION

Figure 1A:
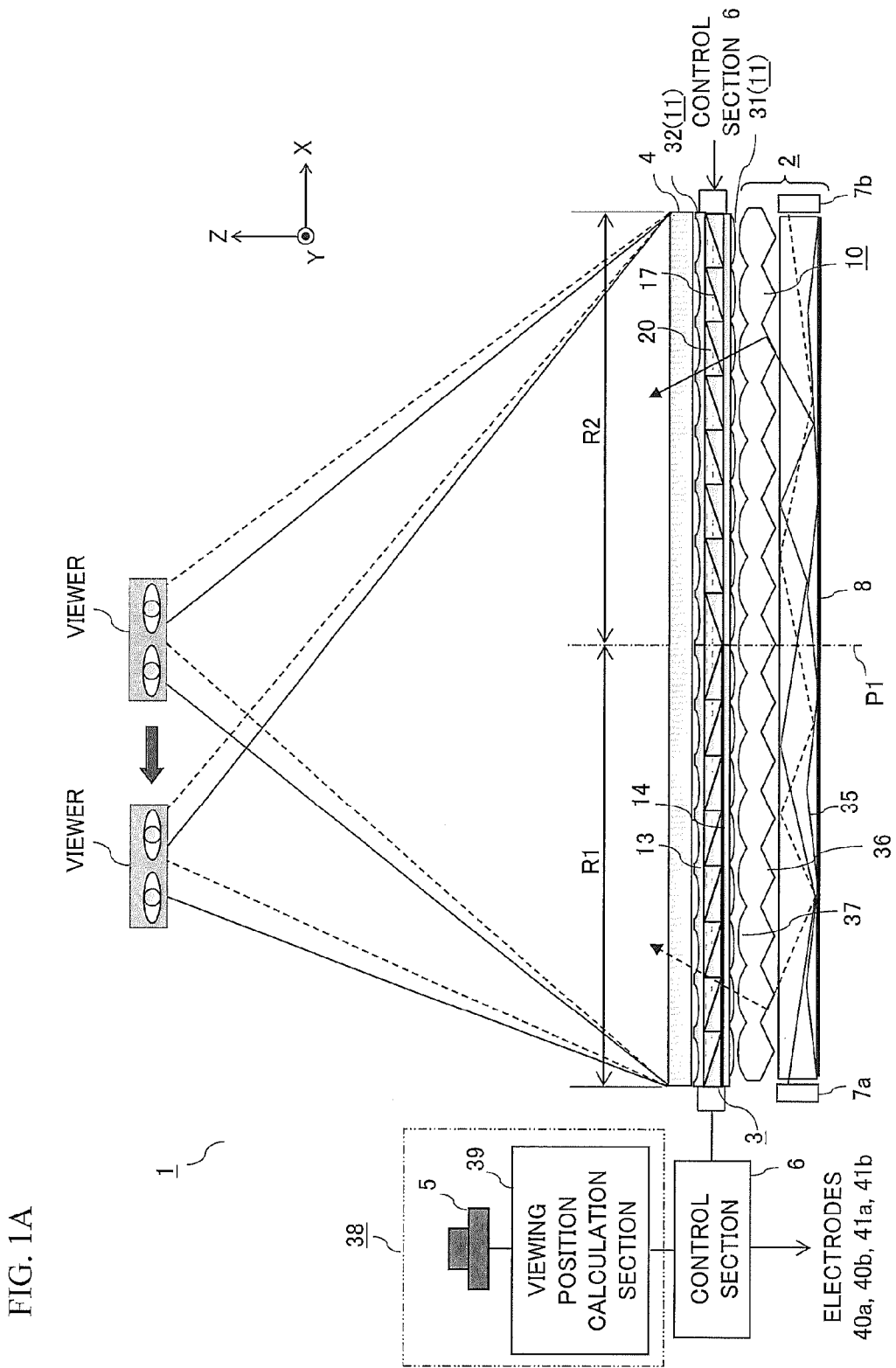
FIG. 1A is a schematic configuration diagram of an image display apparatus according to an embodiment of the present disclosure.

Hereinafter, embodiments will be described in detail with appropriate reference to the drawings. It is noted that a more detailed description than need may be omitted. For example, the detailed description of already well-known matters and the overlap description of substantially same configurations may be omitted. This is to avoid an unnecessarily redundant description below and to facilitate understanding of a person skilled in the art. Furthermore, in the drawings, principal components are schematically illustrated for easy understanding.

It is noted that the inventors provide the accompanying drawings and the following description in order that a person skilled in the art may fully understand the present disclosure, and do not intend to limit the subject matter defined by the claims.

<1. Configuration of Image Display Apparatus>

Figure 1B:
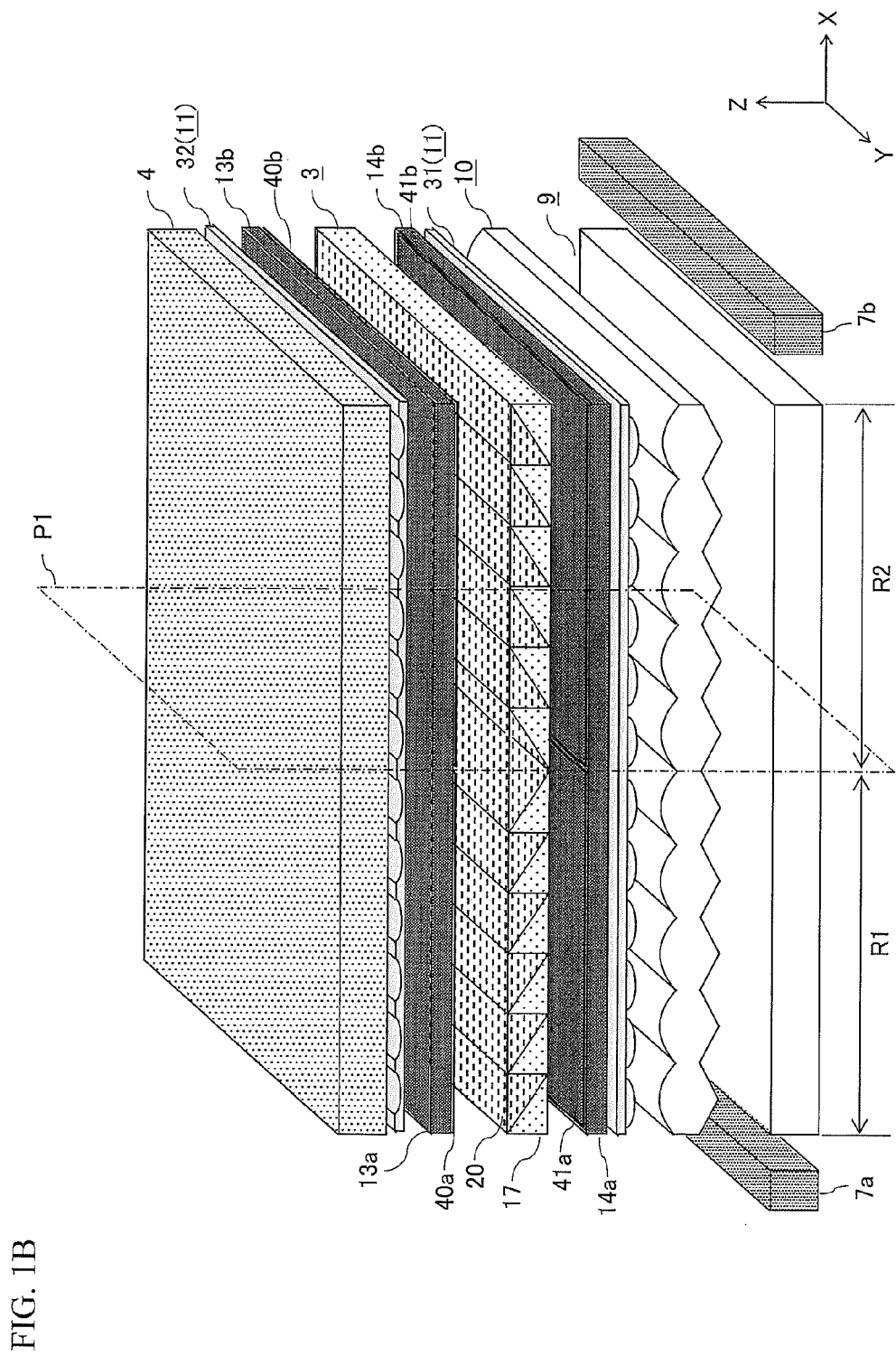
FIG. 1B is an exploded perspective view of a part of the image display apparatus shown in FIG. 1A.

FIG. 1A is a schematic cross-sectional view of an image display apparatus 1 according to an embodiment, and FIG. 1B is an exploded perspective view of a part of the image display apparatus 1 shown in FIG. 1A. It is noted that in FIG. 1A, illustration of electrodes 40a, 40b, 41a, and 41b shown in FIG. 1B is omitted.

In the present embodiment, a three-dimensional orthogonal coordinate system is set for the image display apparatus 1, and a direction is specified by using the coordinate axes. As shown in FIGS. 1A and 1B, an X axis direction coincides with a right-left direction (horizontal direction) when a user faces a display surface of an image display panel 4. A Y axis direction coincides with an up-down direction when the user faces the display surface of the image display panel 4. A Z axis direction coincides with a direction perpendicular to the display surface of the image display panel 4. Here, "facing" means that the user is located directly in front of the display surface such that, for example, when a letter of "A" is displayed on the display surface, the user sees the letter of "A" from a correct direction. In addition, FIGS. 1A and 1B correspond to views as seen from above the image display apparatus 1. Thus, the left side in FIGS. 1A and 1B corresponds to the right side of the display screen when a viewer sees the display screen.

The image display apparatus 1 includes a light source switching type backlight 2, a liquid crystal prism element 3, an afocal optical system 11 formed so as to sandwich the liquid crystal prism element 3, the image display panel 4 which displays an image for a right eye and an image for left eye while alternately switching between the image for right eye and the image for left eye, a position detection section 38 which detects the position of a user who uses the image display apparatus 1, and a control section 6 which controls a liquid crystal driving voltage outputted to the liquid crystal prism element 3, on the basis of information of the detected position of the user. Hereinafter, each component will be described in detail.

The backlight 2 includes light sources 7a and 7b facing each other, a reflection film 8, a light guide plate 9, and a light control film 10. The reflection film 8 is provided on a lower surface side of the light guide plate 9, and the light control film 10 is provided on an upper surface side of the light guide plate 9.

The light sources 7a and 7b are arranged so as to extend along a pair of side surfaces, respectively, of the light guide plate 9, and face each other in the X axis direction. The light source 7a is located at the left side surface of the light guide plate 9, and the light source 7b is located at the right side surface of the light guide plate 9. Each of the light sources 7a and 7b has a plurality of LED elements arranged in the Y axis direction. Each of the light sources 7a and 7b alternately repeats lighting-up and going-out in synchronization with switching between the image for right eye and the eye image for left eye which are displayed on the image display panel 4. In other words, when the image display panel 4 displays the image for right eye, the light source 7a lights up and the light source 7b goes out, and when the image display panel 4 displays the image for left eye, the light source 7a goes out and the light source 7b lights up.

Light emitted from the light sources 7a and 7b spreads within the light guide plate 9 while being repeatedly totally reflected at the upper surface and the lower surface of the light guide plate 9. Light having an angle exceeding the total reflection angle within the light guide plate 9 is emitted from the upper surface of the light guide plate 9. The lower surface of the light guide plate 9 is composed of a plurality of inclined surfaces 35 as shown in FIGS. 1A and 1B. By these inclined surfaces 35, light propagating within the light guide plate 9 is reflected in various directions, and thus the intensity of the light emitted from the light guide plate 9 becomes uniform across the entire upper surface.

The reflection film 8 is provided on the lower surface side of the light guide plate 9. Light having an angle exceeding the total reflection angles of the inclined surfaces 35 provided in the lower surface of the light guide plate 9 is reflected by the reflection film 8, enters the light guide plate 9 again, and is eventually emitted from the upper surface. The light emitted from the light guide plate 9 is incident on the light control film 10.

On a lower surface of the light control film 10, a plurality of prisms 36 each having a triangular cross section and a ridge line extending in the Y axis direction are aligned along the X axis direction. In other words, on the lower surface of the light control film 10, the prisms 36 each having a triangular cross section are arranged in a one-dimensional array. In addition, on an upper surface of the light control film 10, a plurality of cylindrical lenses 37 extending in the Y axis direction are aligned in the X axis direction. In other words, a lenticular lens is formed on the upper surface of the light control film 10.

The light incident on the lower surface of the light control film 10 is refracted toward the Z axis direction by the prisms 36, converged by the lenticular lens located on the upper surface, and is incident on the liquid crystal prism element 3.

Figure 1C:
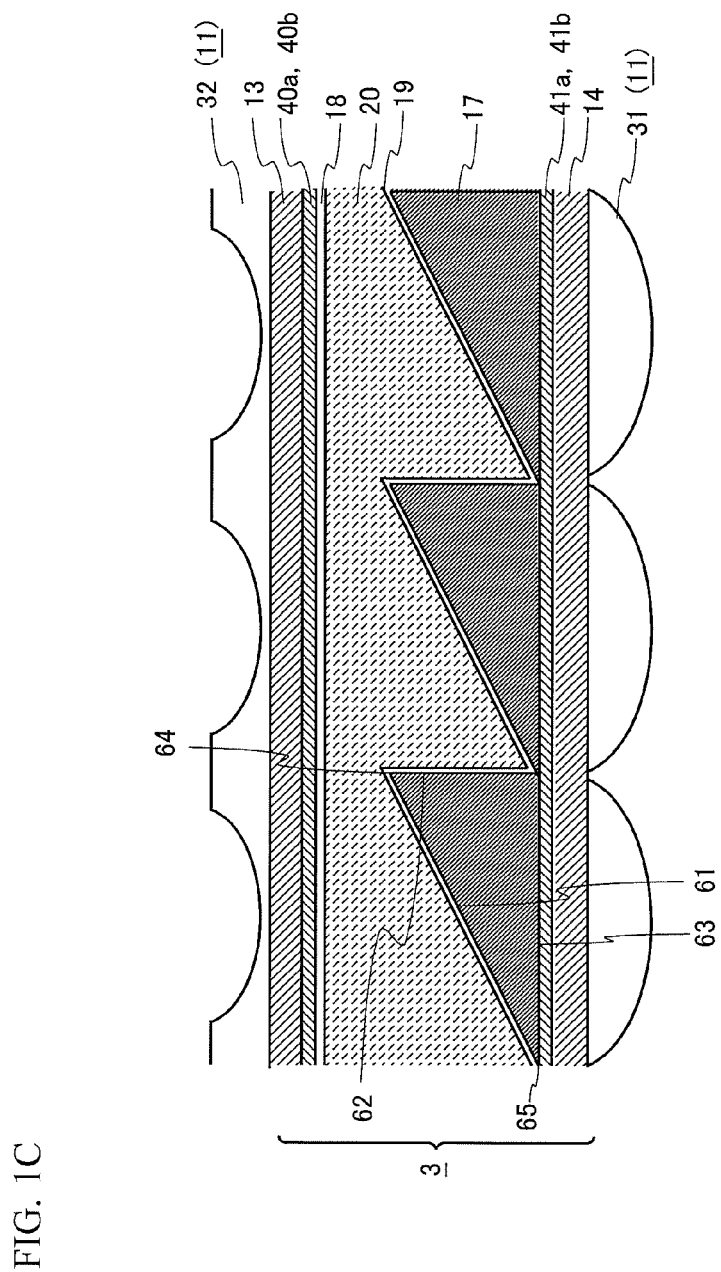
FIG. 1C is an enlarged view of a liquid crystal prism element and an afocal optical system shown in FIG. 1A.

FIG. 1C is an enlarged view of the liquid crystal prism element and the afocal optical system shown in FIG. 1A.

Hereinafter, the liquid crystal prism element 3 and the afocal optical system 11 will be described in detail with reference to FIGS. 1A to 1C.

The liquid crystal prism element 3 controls a deflection direction such that the light that is emitted from the left-side light source 7a and incident thereon through the light guide plate 9 and the light control film 10 is converged at the position of the right eye of the user. In addition, the liquid crystal prism element 3 controls a deflection direction such that the light that is emitted from the right-side light source 7b and incident thereon through the light guide plate 9 and the light control film 10 is converged at the position of the left eye of the user.

More specifically, the liquid crystal prism element 3 includes a pair of opposing substrates 13 and 14, a plurality of prisms 17 and a liquid crystal layer 20 sealed between the opposing substrates 13 and 14, the electrodes 40a and 40b provided on an inner surface of the opposing substrate 13, the electrodes 41a and 41b provided on an inner surface of the opposing substrate 14, an alignment film 18 provided on the electrodes 40a and 40b, and an alignment film 19 provided on an inclined surface 61 and a side surface 62 of each prism 17. Although not shown in the drawings, a polarizer whose transmission axis extends in the Y axis direction is provided in the image display panel 4. Thus, light of components in vibration directions other than the Y axis direction is absorbed. It is noted that the polarizer may be provided on each of outer surfaces of the opposing substrates 13 and 14.

Each prism 17 is formed in a triangular pole shape having a triangular cross section and a ridge line 64 extending in the Y axis direction, and has the inclined surface 61, the side surface 62, and a bottom surface 63.

As understood from FIGS. 1A and 1B, a plurality of the prisms 17 are provided on the electrodes 41a and 41b so as to be aligned in the X axis direction. Cross-sectional shapes of a plurality of the prisms 17 are formed so as to be bilaterally symmetrical in the entire liquid crystal prism element 3. For facilitating the explanation, the region where the prisms 17 are formed is divided into left and right halves in FIGS. 1A and 1B, the left-side region is indicated by R1, and the right-side region adjacent to the region R1 in the X axis direction is indicated by R2. In addition, a plane that passes through the border line (center line) between the regions R1 and R2 and is orthogonal to the display surface of the image display panel 4 is indicated by P1. The cross-sectional shape of the prisms 17 located in the region R1 and the cross-sectional shape of the prisms 17 located in the region R2 are designed so as to be symmetrical to each other about the plane P1 when seen on a plane parallel to an XZ plane, as shown in FIGS. 1A and 1B.

The electrode 40a is formed in the region R1 of the inner surface of the opposing substrate 13. The electrode 40b is formed in the region R2 of the inner surface of the opposing substrate 13. Similarly, the electrode 41a is formed in the region R1 of the inner surface of the opposing substrate 14, and the electrode 41b is formed in the region R2 of the inner surface of the opposing substrate 14.

Furthermore, the alignment films 18 and 19 which are subjected to orientation treatment for controlling the orientation directions of liquid crystal molecules into a desired direction are provided on the surfaces of the prisms 17 and the electrodes 40a and 40b. The alignment films 18 and 19 orient the liquid crystal molecules such that the long axes of the liquid crystal molecules extend in the Y axis direction in a state where no voltage is applied to the electrodes 40a, 40b, 41a, and 41b. It is noted that the alignment films 18 and 19 may be omitted as long as the orientations of the liquid crystal molecules are kept uniform.

As the materials of the opposing substrates 13 and 14 and the prisms 17, glass or resin can be used. When resin is used as the material of the prisms 17, the prisms 17 can be formed by, as an example, imprinting a UV-curing resin on a glass substrate. The liquid crystal prism element 3 can be produced by forming a one-dimensional array of the prisms 17 on the opposing substrate 14 on which the electrodes 41a and 41b have been formed, then attaching together the opposing substrate 14 and the opposing substrate 13 on which the electrodes 40a and 40b have been formed, and injecting a liquid crystal between the opposing substrates 13 and 14.

The liquid crystal prism element 3 is an element that can control the magnitude of the deflection angle of transmitted light according to the magnitude of a voltage applied from the outside. The principle will be described briefly. In general, a liquid crystal molecule has an ellipsoidal shape and has different dielectric constants in the longitudinal direction and the lateral direction thereof. Thus, the liquid crystal layer 20 has a birefringence property in which a refractive index is different for each polarization direction of incident light. In addition, when the direction of the orientation (director) of each liquid crystal molecule relatively changes with respect to the polarization direction of light, the refractive index of the liquid crystal layer 20 also changes. Thus, when the orientation of the liquid crystal is changed by an electric field generated by applying a certain voltage, the refractive index for transmitted light changes, and thus a deflection angle which is a refraction angle of the light changes.

In the present embodiment, a case where uniaxial positive type liquid crystal is used as the material forming the liquid crystal layer 20 will be considered. Then, a case where the liquid crystal molecules are oriented in the Y axis direction when no voltage is applied as described above and a case where the liquid crystal molecules are oriented in the Z axis direction when a voltage is applied will be considered.

Since the transmission axis of the image display panel 4 extends in the Y axis direction, the refractive index of the liquid crystal layer 20 when no voltage is applied is an extraordinary light refractive index, and the refractive index of the liquid crystal layer 20 when a voltage is applied is an ordinary light refractive index.

In general, in the case where light is deflected by an active element such as the liquid crystal prism element 3, it is desirable to use a liquid crystal material having high $\Delta n$ (=refractive index ne for extraordinary light−refractive index no for ordinary light), in order to increase a deflection angle. However, among commercially available materials, the number of liquid crystal materials having high $\Delta n$ is small, and $\Delta n$ is generally about 0.2.

In addition, even when the liquid crystal prism is formed using the same liquid crystal material, design of the orientation direction and a manner of applying an electric field are important items that have a great influence on the element performance, which is the ability of the liquid crystal prism element, such as a deflection angle, electric power, a switching speed.

It is noted that in the liquid crystal prism element 3, the inclination direction of each inclined surface of each prism 17 is different between the right and left sides of the center line of the screen (the plane P1). The liquid crystal prism element 3 has a property in which the efficiency of deflection toward a direction in which emitted light gets close to the inclined surface of each prism 17 (an upper right direction in FIG. 1C) is low as compared to that of deflection toward a direction in which emitted light becomes more distant from the inclined surface of each prism 17 (an upper left direction in FIG. 1C). Thus, when the inclined surfaces of the prisms 17 are made symmetrical about the plane P1 and are also made to face ahead of the center portion of the screen, the liquid crystal prism element 3 can efficiently deflect light incident near the left edge of the screen, toward ahead of the screen on the right, and can efficiently deflect light incident near the right edge of the screen, toward ahead of the screen on the left. In this case, different voltages are applied to the right and left regions of the liquid crystal prism element 3. Thus, the electrodes 40a and 40b and the electrodes 41a and 41b are separated at the center of the screen. When both electrodes in the same substrate are used as ground terminals, the electrodes may not be separated at the center.

The afocal optical system 11 is composed of: a plurality of first lenses 31 located between the liquid crystal prism element 3 and the backlight device 2; and a plurality of second lenses 32 located between the liquid crystal prism element 3 and the image display panel 4. Each first lens 31 corresponds to each second lens 32 in a one-to-one relation. The first lenses 31 and the second lenses 32 may be formed by molding resin, glass, or the like on the outer surfaces of a pair of the opposing substrates 13 and 14 of the liquid crystal prism element 3, or may be molded integrally with the opposing substrates 13 and 14. In addition, the first lenses 31 and the second lenses 32 may be formed as separate sheets independently of the opposing substrates 13 and 14. Typically, a cylindrical lens extending in a direction parallel to the Y axis can be used as each of the first lenses 31 and the second lenses 32, but the first lenses 31 and the second lenses 32 may be arrays of lenses which are arranged in a matrix in the X axis direction and the Y axis direction.

In the example shown in FIG. 1C, each first lens 31 has positive optical power, and each second lens 32 has negative optical power. It is noted that as described later, lenses having positive optical power may be used as both the first lenses 31 and the second lenses 32.

The afocal optical system 11 has a property that when light having a predetermined angle relative to the optical axis of each first lens 31 is incident thereon, light having an angle relative to the optical axis of each second lens 32 which angle is obtained by multiplying the predetermined angle by an afocal magnification is emitted. Specifically, when the afocal magnification is 1.5 times, light incident at an angle of 10° relative to the optical axis of each first lens 31 is emitted at an angle of 15° relative to the optical axis of each second lens 32. Light incident on each first lens 31 is subjected to a deflection effect of the liquid crystal prism element 3 corresponding to a voltage applied thereto and is also subjected to the effect of the afocal optical system 11 before being emitted from each second lens 32. Thus, the adjustable range of the emission angle of emitted light can be expanded as compared to the case where an image display apparatus is configured only with the liquid crystal prism element 3.

Light transmitted through the liquid crystal prism element 3 is incident on the image display panel 4. One example of the image display panel 4 is an in-plane-switching type panel. However, another type of image display panel can be used as the image display panel 4. Light transmitted through the image display panel 4 has directivity and is converged at the position of an eye of the viewer.

The image display apparatus 1 switches between the light sources 7a and 7b in synchronization with switching between the image for right eye and the image for left eye. In addition, when the switching between the image for right eye and the image for left eye is performed at a frequency equal to or higher than 120 Hz, the user can recognize a stereoscopic image on the basis of the image for right eye and the image for left eye.

The position detection section 38 includes a camera 5 and a viewing position calculation section 39. The camera 5 takes an image of the user in predetermined cycles. The viewing position calculation section 39 analyzes the image taken by the camera 5 and calculates viewing position information representing a viewing position of the user. For image analysis performed by the camera 5, a known algorithm for recognizing the position of a face or a portion (eyes, nose, etc.) of a face can be used. In addition, the viewing position information calculated by the viewing position calculation section 39 preferably represents the positions of the eyes of the user, but may represent the position of the face, the nose, or the like instead of the positions of the eyes.

The control section 6 controls the value of a voltage applied to the liquid crystal prism element 3, on the basis of the viewing position information calculated by the viewing position calculation section 39. More specifically, when the viewing position of the user shifts from a position in front of the screen center to the left edge side as shown in FIG. 1A, the light emitted from each prism 17 is deflected in the right direction as seen from the user, by making the refractive index of the liquid crystal layer 20 lower than the refractive index of each prism 17 in the region R1 and making the refractive index of the liquid crystal layer 20 higher than the refractive index of each prism 17 in the region R2. At that time, the deflection angle in the region R1 and the deflection angle in the region R2 can be adjusted by making the voltage applied to the region R1 higher than a voltage applied when light is not deflected and making the voltage applied to the region R2 lower than the voltage applied when light is not deflected. In contrast, when the viewing position of the user shifts from a position in front of the screen center to the right edge side, the light emitted from each prism 17 is deflected in the left direction as seen from the user, by making the refractive index of the liquid crystal layer 20 higher than the refractive index of each prism 17 in the region R1 and making the refractive index of the liquid crystal layer 20 lower than the refractive index of each prism 17 in the region R2. At that time, the deflection angle in the region R1 and the deflection angle in the region R2 can be adjusted by making the voltage applied to the region R1 lower than the voltage applied when light is not deflected and making the voltage applied to the region R2 higher than the voltage applied when light is not deflected.

It is noted that the deflection angle of the liquid crystal prism element 3 and position information of a converged point of light with respect to an applied voltage can be assumed at the stage of designing, and thus it suffices to previously prepare data that associates an applied voltage with position information and to store the data in a storage unit provided in the image display apparatus 1. In addition, after completion of a product, calibration may be performed to correct the position of a light converged point.

A refraction angle at the interface between each triangular prism and the liquid crystal layer is determined by the difference between the refractive index of the triangular prism and the refractive index of the liquid crystal layer. Thus, by changing a voltage applied to the liquid crystal layer, the emission angle of light emitted from the liquid crystal prism element can be controlled within a predetermined range. Therefore, in use of an image display apparatus to cause a light-converged position to follow the position of a viewer, a liquid crystal material of which the range of the refractive index changed by application of a voltage is as wide as possible is preferably used, in order to be able to expand a range where the light-converged position follows.

However, in the currently available liquid crystal material, the range of the refractive index which can be changed by application of a voltage is limited. Thus, the range of the emission angle of light which can be adjusted by controlling a voltage applied to the liquid crystal prism element is also limited.

By repeating the above-described deflection control based on the viewing position information in predetermined cycles, it is made possible for the viewer to view a stereoscopic image at an arbitrary location even when the viewer freely moves relative to the image display apparatus 1. Thus, according to the present disclosure, by using the afocal optical system 11 and the liquid crystal prism element 3 in combination, an image display apparatus having a wide view range can be realized as compared to the case where an image display apparatus is configured only with the liquid crystal prism element 3. In addition, by converging light at the position of an eye of the viewer, a high-brightness and energy-saving image display apparatus 1 can be realized.

In addition, the orientations of the liquid crystal molecules within the liquid crystal layer 20 are not uniform, and the orientations of the liquid crystal molecules are likely to become ununiform near the ridge line 64 of the inclined surface 61 of each prism 17 and near the bottom 65 of each prism 17. By converging light incident on the liquid crystal prism element 3 by using the first lenses 31 as in the present disclosure, an amount of light passing near the ridge line 64 and the bottom 65 where the orientation states of the liquid crystal molecules are ununiform can be reduced. Therefore, a shift of the position at which light emitted from the image display apparatus 1 is converged is reduced, and the image quality can be improved.

Furthermore, in the case where light is converged toward ahead of the right or left side portion of the image display panel 4, it is necessary to increase the angle of deflection by the liquid crystal prism element 3. In this case, a portion of light emitted from a certain prism 17 may be shaded by an adjacent prism 17. In the present disclosure, since light incident on the liquid crystal prism element 3 is converged by using each first lens 31, the diameter of a light beam passing through the liquid crystal layer 20 is decreased, and the shading by the adjacent prism 17 can be reduced.

In the present embodiment, the light guide plate is shared by the light sources 7a and 7b. However, a light guide plate for the light source 7a and a light guide plate for the light source 7b may be provided so as to be laminated on each other.

In addition, instead of the control film 10 in which the prisms and the lenticular lens are integrated, a prism sheet and a lenticular lens sheet may be individually provided.

Furthermore, the backlight 2 is not limited to have the configuration shown in FIGS. 1A and 1B, and may have another configuration as long as it can alternately emit light for right eye and light for left eye in a time division manner in synchronization with switching between right and left image signals.

Furthermore, in the present embodiment, the directions of the inclined surfaces of the prisms 17 in the liquid crystal prism element 3 are made different between the regions R1 and R2, and the inclined surfaces of the prisms 17 are formed so as to be symmetrical about the plane P1. However, the directions of the inclined surfaces of the prisms may be uniform in the entire liquid crystal prism element 3. In this case, instead of providing the separate electrodes in the regions R1 and R2 of the liquid crystal prism element 3 as in the present embodiment, a single electrode is provided over the entire display screen. However, it is more preferred to provide the prisms 17 and the electrodes separately in the two regions R1 and R2, in terms of the deflection angle and transmission efficiency of a light beam with respect to orientation change.

Furthermore, the present embodiment has been described with, as an example, a stereoscopic image display apparatus that displays, in a time division manner, an image for right eye and an image for left eye that have a parallax. However, an image having no parallax may be displayed. In this case, the light sources 7a and 7b are constantly lit up instead of being alternately lit up. In addition to the case of displaying a three-dimensional image, also when a two-dimensional image is displayed, the displayed content can be prevented from being seen by surrounding people and privacy protection can also be improved, by following movement of the viewer and projecting an image only on the eyes of the viewer and the vicinity thereof in a reduced range.

Furthermore, in the present embodiment, the liquid crystal prism element 3 is formed by sealing the prisms 17 and the liquid crystal layer 20 between the opposing substrates 13 and 14. However, prisms which deflect incident light and a liquid crystal element which changes a deflection angle of emitted light according to a voltage applied thereto may be separately provided.

Furthermore, in the example shown in FIG. 1C, the electrode layer is provided on the inner surface of the opposing substrate 14. However, the electrode layer may be provided on the inclined surface 61 and the side surface 62 of each prism 17.

<2. Detailed Configuration of Liquid Crystal Prism Element and Afocal Optical System>

Hereinafter, configurations of liquid crystal prism elements and afocal optical systems according to Embodiments 1 to 4 will be described in detail with reference to FIGS. 2 to 5.

(Embodiment 1)

Figure 2:
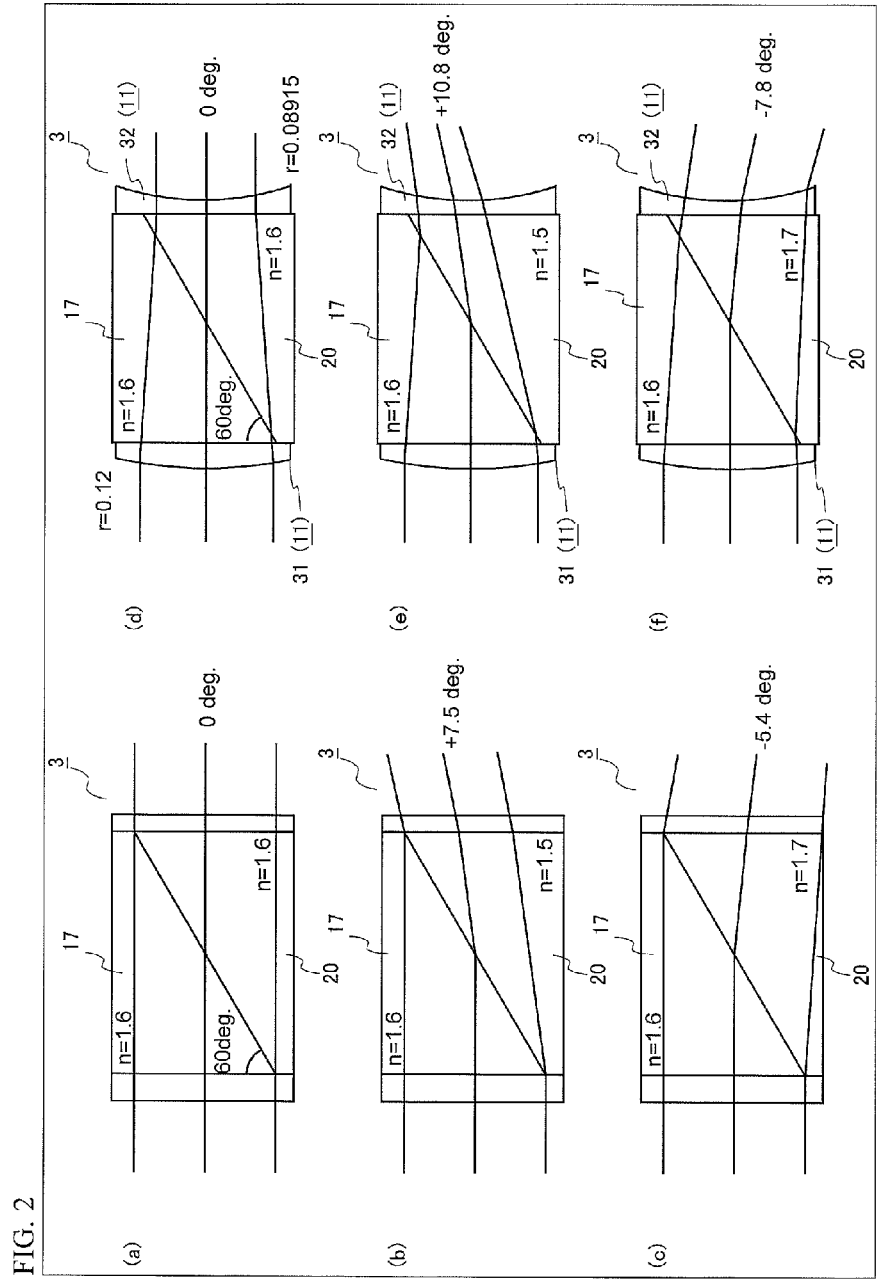
FIG. 2 is optical path diagrams of the liquid crystal prism element and the afocal optical system according to Embodiment 1.

FIG. 2 is optical path diagrams of the liquid crystal prism element and the afocal optical system according to Embodiment 1. In FIG. 2, optical path diagrams of light transmitted through the liquid crystal prism element are shown in the left column, and optical path diagrams of light transmitted through the liquid crystal prism element and the afocal optical system according to Embodiment 1 are shown in the right column. In addition, in FIG. 2, optical path diagrams in the case where the refractive indexes of the prism and the liquid crystal layer are equal to each other are shown in the upper part; optical path diagrams in the case where the refractive index of the liquid crystal layer is lower than that of the prism are shown in the middle part; and optical path diagrams in the case where the refractive index of the liquid crystal layer is higher than that of the prism are shown in the lower part. Here, the sign of the emission angle of emitted light relative to the normal line of the substrate of the liquid crystal prism element is set to be positive when the refractive index of the liquid crystal layer is lower than that of the prism.

In the liquid crystal prism element 3 shown in FIG. 2, the refractive index of the prism 17 is 1.6, the variation range of the refractive index of the liquid crystal layer 20 is 1.5 to 1.7, and the inclination angle of the inclined surface 61 of the prism 17 is 60°. In addition, in the afocal optical system 11 shown in (d) to (f) of FIG. 2, the first lens 31 is a plano-convex lens having a convex surface with a radius of curvature of 0.12 mm, and the second lens 32 is a plano-concave lens having a concave surface with a radius of curvature of 0.08915 mm. In (a) to (c) of FIG. 2, instead of the first lens 31 and the second lens 32, a pair of parallel plates having no optical power are provided so as to sandwich the liquid crystal prism element 3.

As shown in (a) to (c) of FIG. 2, when only the liquid crystal prism element 3 is used, the emission angle of emitted light is −5.4° to +7.5°. On the other hand, as shown in (d) to (f) of FIG. 2, when the liquid crystal prism element 3 and the afocal optical system 11 are used in combination, the emission angle of emitted light is −7.8° to +10.8°. The use of the afocal optical system 11 according to Embodiment 1 makes it possible to expand the range of the emission angle which can be controlled by applying a voltage to the liquid crystal prism element 3.

(Embodiment 2)

Figure 3:
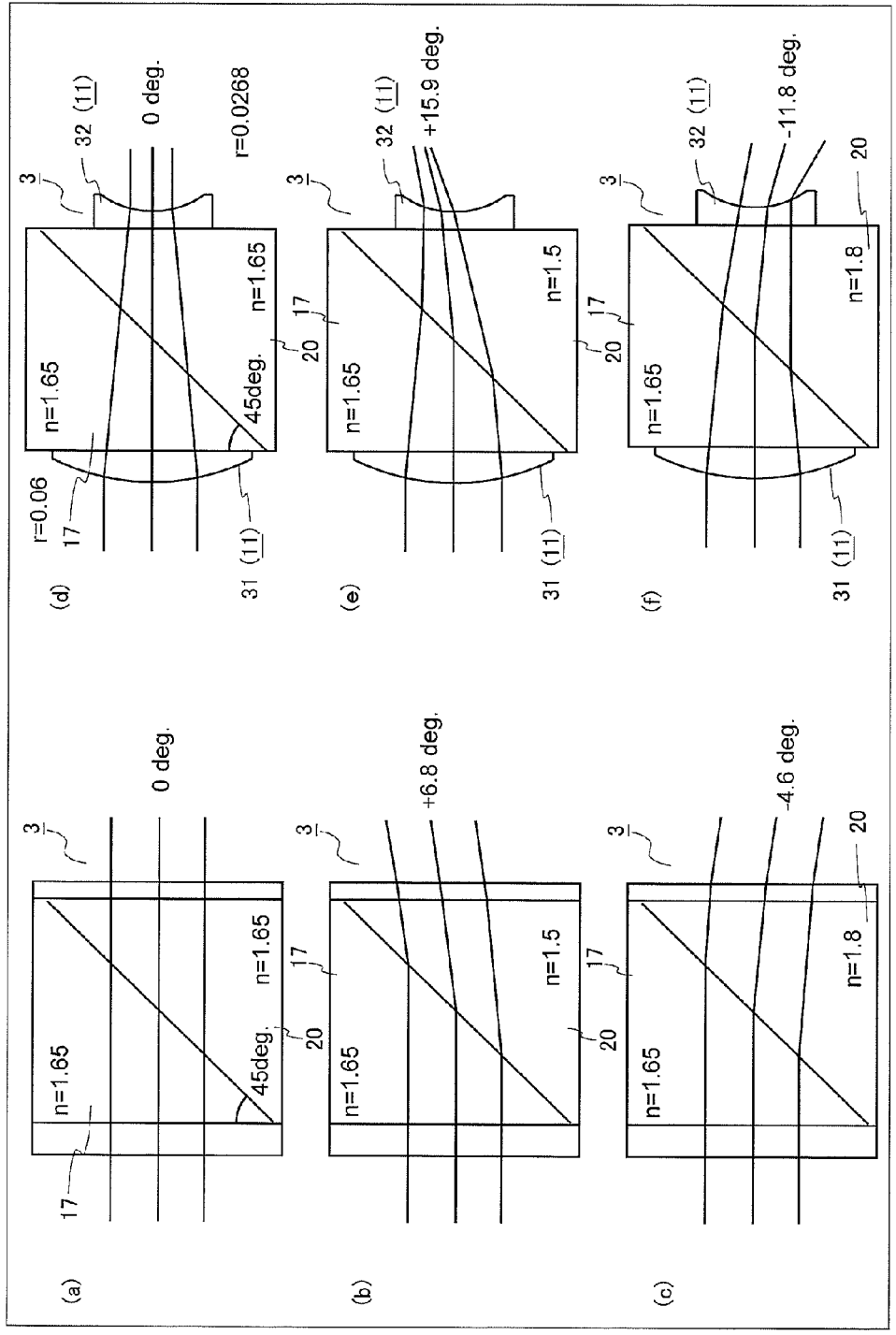
FIG. 3 is optical path diagrams of a liquid crystal prism element and an afocal optical system according to Embodiment 2.

FIG. 3 is optical path diagrams of the liquid crystal prism element and the afocal optical system according to Embodiment 2. In FIG. 3, optical path diagrams of light transmitted through the liquid crystal prism element are shown in the left column, and optical path diagrams of light transmitted through the liquid crystal prism element and the afocal optical system according to Embodiment 2 are shown in the right column. In addition, in FIG. 3, optical path diagrams in the case where the refractive indexes of the prism and the liquid crystal layer are equal to each other are shown in the upper part; optical path diagrams in the case where the refractive index of the liquid crystal layer is lower than that of the prism are shown in the middle part; and optical path diagrams in the case where the refractive index of the liquid crystal layer is higher than that of the prism are shown in the lower part. Here, the sign of the emission angle of emitted light relative to the normal line of the substrate of the liquid crystal prism element is set to be positive when the refractive index of the liquid crystal layer is lower than that of the prism.

In the liquid crystal prism element 3 shown in FIG. 3, the refractive index of the prism 17 is 1.65, the variation range of the refractive index of the liquid crystal layer 20 is 1.5 to 1.8, and the inclination angle of the inclined surface 61 of the prism 17 is 45°. In addition, in the afocal optical system 11 shown in (d) to (f) of FIG. 3, the first lens 31 is a plano-convex lens having a convex surface with a radius of curvature of 0.06 mm, and the second lens 32 is a plano-concave lens having a concave surface with a radius of curvature of 0.0268 mm. In (a) to (c) of FIG. 3, instead of the first lens 31 and the second lens 32, a pair of parallel plates having no optical power are provided so as to sandwich the liquid crystal prism element 3.

As shown in (a) to (c) of FIG. 3, when only the liquid crystal prism element 3 is used, the emission angle of emitted light is −4.6° to +6.8°. On the other hand, as shown in (d) to (f) of FIG. 3, when the liquid crystal prism element 3 and the afocal optical system 11 are used in combination, the emission angle of emitted light is −11.8° to +15.9°. The use of the afocal optical system 11 according to Embodiment 2 makes it possible to expand the range of the emission angle which can be controlled by applying a voltage to the liquid crystal prism element 3.

(Embodiment 3)

Figure 4:
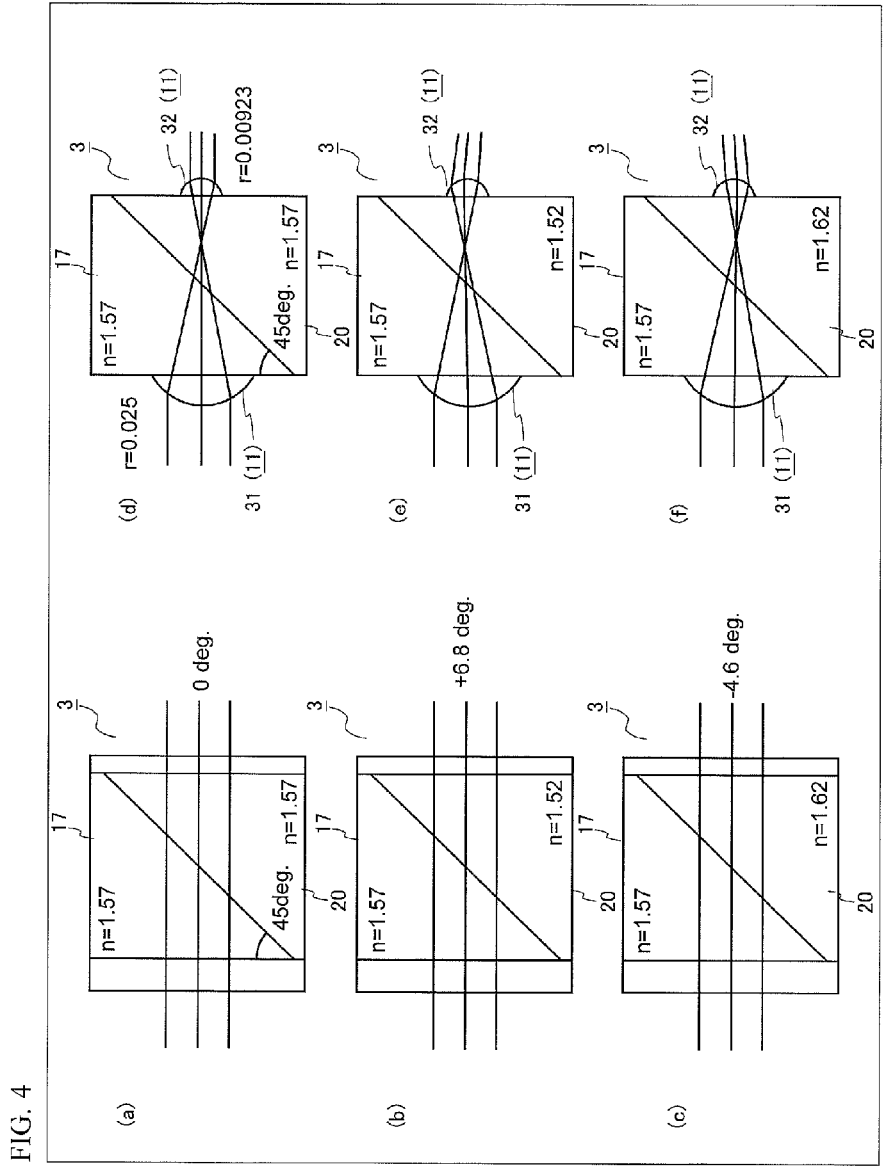
FIG. 4 is optical path diagrams of a liquid crystal prism element and an afocal optical system according to Embodiment 3.

FIG. 4 is optical path diagrams of the liquid crystal prism element and the afocal optical system according to Embodiment 3. In FIG. 4, optical path diagrams of light transmitted through the liquid crystal prism element are shown in the left column, and optical path diagrams of light transmitted through the liquid crystal prism element and the afocal optical system according to Embodiment 3 are shown in the right column. In addition, in FIG. 4, optical path diagrams in the case where the refractive indexes of the prism and the liquid crystal layer are equal to each other are shown in the upper part; optical path diagrams in the case where the refractive index of the liquid crystal layer is lower than that of the prism are shown in the middle part; and optical path diagrams in the case where the refractive index of the liquid crystal layer is higher than that of the prism are shown in the lower part. Here, the sign of the emission angle of emitted light relative to the normal line of the substrate of the liquid crystal prism element is set to be positive when the refractive index of the liquid crystal layer is lower than that of the prism.

In the liquid crystal prism element 3 shown in FIG. 4, the refractive index of the prism 17 is 1.57, the variation range of the refractive index of the liquid crystal layer 20 is 1.52 to 1.62, and the inclination angle of the inclined surface 61 of the prism 17 is 45°. In addition, in the afocal optical system 11 shown in (d) to (f) of FIG. 4, the first lens 31 is a plano-convex lens having a convex surface with a radius of curvature of 0.025 mm, and the second lens 32 is a plano-convex lens having a convex surface with a radius of curvature of 0.00923 mm. In (a) to (c) of FIG. 4, instead of the first lens 31 and the second lens 32, a pair of parallel plates having no optical power are provided so as to sandwich the liquid crystal prism element 3.

As shown in (a) to (c) of FIG. 4, when only the liquid crystal prism element 3 is used, the emission angle of emitted light is −2.8° to +2.9°. On the other hand, as shown in (d) to (f) of FIG. 4, when the liquid crystal prism element 3 and the afocal optical system 11 are used in combination, the emission angle of emitted light is −7.1° to +6.5°. The use of the afocal optical system 11 according to Embodiment 3 makes it possible to expand the range of the emission angle which can be controlled by applying a voltage to the liquid crystal prism element 3.

(Embodiment 4)

Figure 5:
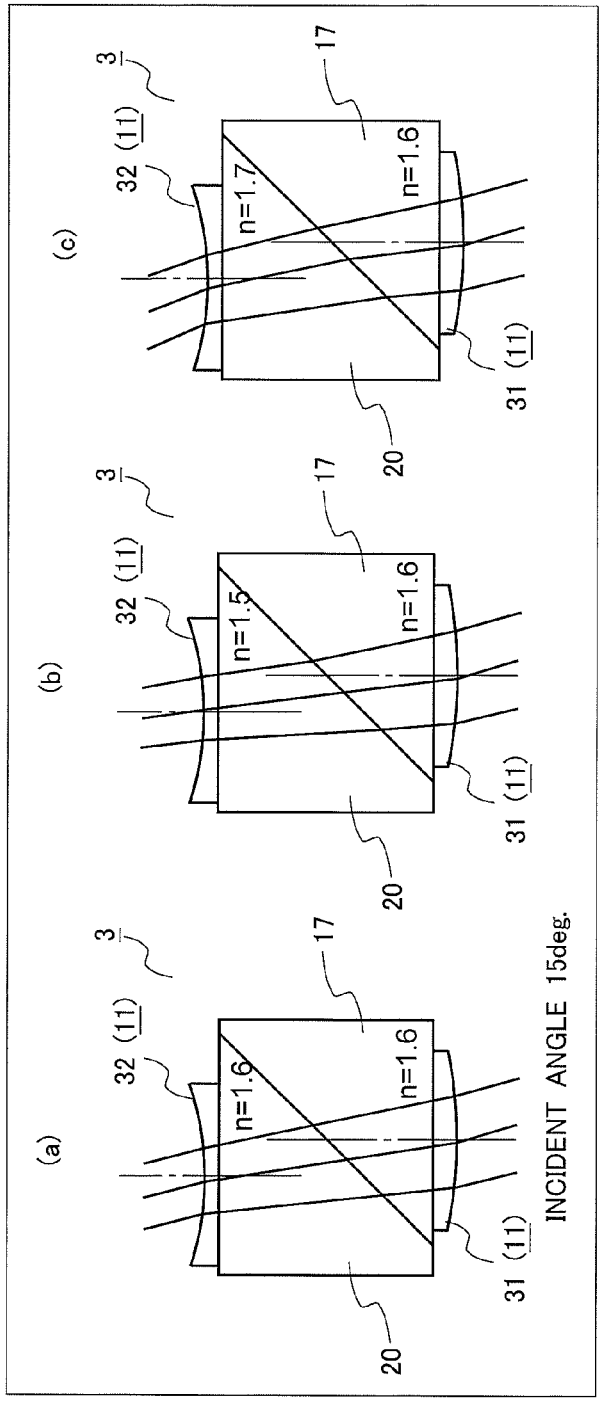
FIG. 5 is optical path diagrams of a liquid crystal prism element and an afocal optical system according to Embodiment 4.

FIG. 5 is optical path diagrams of the liquid crystal prism element and the afocal optical system according to Embodiment 4. More specifically, (a) of FIG. 5 shows an optical path diagram in the case where the refractive indexes of the prism and the liquid crystal layer are equal to each other, (b) of FIG. 5 shows an optical path diagram in the case where the refractive index of the liquid crystal layer is lower than that of the prism, and (c) of FIG. 5 shows an optical path diagram in the case where the refractive index of the liquid crystal layer is higher than that of the prism. In FIG. 5, the left side of the sheet corresponds to the center side of the image display apparatus.

The backlight device 2 is configured such that emitted light is alternately converged at the position of the right eye and the position of the left eye of a viewer who faces the center of the image display panel 4. Thus, near the right side edge and the left side edge of the liquid crystal prism element 3, light from the backlight device 2 is incident from an oblique direction. Thus, in the present embodiment, the optical axis of each second lens 32 is offset on the center side with respect to the optical axis of each first lens 31 in the lateral portion of the screen more than in the center portion of the liquid crystal prism element 3. By locating the second lens 32 as described above, the light use efficiency can be improved in the lateral portion of the screen more than in the center portion of the screen.

It is noted that when the optical axis of each second lens 32 is offset with respect to the optical axis of each first lens 31 at least in the vicinity of the right side edge and the vicinity of the left side edge of the screen, the light use efficiency in the lateral portion of the screen can be improved, but the offset amount of the optical axis may be changed over the entire surface of the liquid crystal prism element 3. Specifically, it suffices that each second lens 32 is located closer to the center portion of the liquid crystal prism element 3 such that the offset amount of the optical axis of the second lens 32 with respect to the optical axis of the first lens 31 is increased in a continuous manner or in a phased manner from the center portion to the lateral portion of the liquid crystal prism element 3 in the horizontal direction.

With such a configuration, the adjustable range of the emission angle of light transmitted through the lateral portion of the liquid crystal prism element 3 can be expanded. Thus, the range where light is converged can be expanded, and the light use efficient in the lateral portion of the liquid crystal prism element 3 can be improved.

The image display apparatus according to the present disclosure automatically deflects a light beam to the position of the viewer on the basis of the position information of the viewer, and thus can realize high brightness, high efficiency, and high resolution. Therefore, the present disclosure is widely applicable not only to use of displaying a three-dimensional image but also to use of displaying a two-dimensional image. Furthermore, the present disclosure is applicable to a 3D liquid crystal display apparatus, a privacy display, and the like by a simple configuration.

The embodiments have been described above as illustrative examples of the technology in the present disclosure. For that, the accompanying drawings and the detailed description have been provided.

Therefore, the constituent elements described in the accompanying drawings and the detailed description may include not only constituent elements essential for solving the problems but also constituent elements non-essential for solving the problems, in order to illustrate the technology described above. Thus, these non-essential constituent elements should not be readily recognized as being essential, due to these non-essential constituent elements being described in the accompanying drawings and the detailed description.

Furthermore, since the embodiment described above are intended to illustrate the technology in the present disclosure, various changes, substitutions, additions, omissions, and the like can be made within the scope of the claims and the scope of equivalents thereof. Moreover, each constituent element described in Embodiments 1 to 4 described above can be combined to provide a new embodiment.

What is claimed is:

1. An image display apparatus comprising:
    an image display panel for displaying images in response to image signals;
    a backlight device located on a back surface side of the image display panel;
    a first optical element located between the image display panel and the backlight device and configured to deflect a light incident thereon as the light passes through the first optical element;
    a second optical element located between the first optical element and the image display panel and configured to further deflect the light deflected by the first optical element as the light passes through the second optical element and to change a deflection angle of emitted light according to a voltage applied thereto;

a plurality of first lenses, which are lenticular lenses, located between the first optical element and the backlight device;

a plurality of second lenses, which are lenticular lenses, located between the second optical element and the image display panel;

a position detector configured to detect a viewing position of a viewer; and a controller electrically coupled to the second optical element and configured to control the voltage applied to the second optical element, according to the viewing position detected by the position detector, wherein:

the plurality of first lenses and the plurality of second lenses constitute an afocal optical system, and the second optical element includes liquid crystal and is configured to change a refractive index by the voltage applied thereto.

2. The image display apparatus according to claim 1, wherein:

each of the plurality of first lenses and each of the plurality of second lens are located so as to correspond to each other, and each of the plurality of first lens is located such that an optical axis of the each of the plurality of first lenses is offset on a lateral side with respect to an optical axis of each of the plurality of second lenses in a region on a lateral side of the image display panel more than in a region at a center of the image display panel.

3. The image display apparatus according to claim 1, wherein each of the plurality of first lenses has positive optical power, and each of the plurality of second lens lenses negative optical power.

4. The image display apparatus according to claim 1, wherein the plurality of first lenses and the plurality of second lenses have positive optical power.

5. An image display apparatus comprising:

an image display panel for displaying images in response to image signals;

a backlight device located on a back surface side of the image display panel;

a first optical element located between the image display panel and the backlight device and configured to deflect a light incident thereon;

a second optical element located between the first optical element and the image display panel and configured to further deflect the light deflected by the first optical element and to change a deflection angle of emitted light according to a voltage applied thereto;

a plurality of first lenses located between the first optical element and the backlight device;

a plurality of second lenses located between the second optical element and the image display panel;

a position detector configured to detect a viewing position of a viewer; and a controller configured to control the voltage applied to the second optical element, according to the viewing position detected by the position detector, wherein:

the plurality of first lenses and the plurality of second lenses constitute an afocal optical system, an image signal for right eye and an image signal for left eye to which a parallax is provided are alternately inputted into the image display panel in a time division manner, the backlight device includes:
  a light guide plate having a pair of side surfaces and configured to guide light incident on the side surfaces, to an exit surface;
  a first light source located so as to face one of side surfaces and configured to emit illumination light for displaying an image for right eye;
  a second light source located so as to face another of the side surfaces and configured to emit illumination light for displaying an image for left eye; and
  a light control sheet configured to deflect the light emitted from the first light source and the second light source toward ahead of a center of the image display panel, and the first light source and the second light source alternately light up in synchronization with switching between the image signal for right eye and the image signal for left eye.

6. The image display apparatus according to claim 1, wherein the image display panel is a liquid crystal display panel.

7. The image display apparatus according to claim 1, wherein the plurality of first lenses are disposed on a first substrate.

8. The image display apparatus according to claim 1, wherein the plurality of second lenses are disposed on a second substrate.

9. An image display apparatus comprising:

an image display panel for displaying images in response to image signals;

a backlight device located on a back surface side of the image display panel;

a first optical element located between the image display panel and the backlight device and configured to deflect a light incident thereon;

a second optical element located between the first optical element and the image display panel and configured to further deflect the light deflected by the first optical element and to change a deflection angle of emitted light according to a voltage applied thereto;

a plurality of first lenses located between the first optical element and the backlight device;

a plurality of second lenses located between the second optical element and the image display panel;

a position detector configured to detect a viewing position of a viewer; and a controller configured to control the voltage applied to the second optical element, according to the viewing position detected by the position detector, wherein:

the plurality of first lenses and the plurality of second lenses constitute an afocal optical system, an image signal for right eye and an image signal for left eye to which a parallax is provided are alternately inputted into the image display panel in a time division manner, the backlight device includes:
  a first light source configured to emit illumination light for displaying an image for right eye; and
  a second light source configured to emit illumination light for displaying an image for left eye, and the first light source and the second light source alternately light up in synchronization with switching between the image signal for right eye and the image signal for left eye.

10. The image display apparatus according to claim 1, wherein:

the first optical element includes plural first prisms, and
the second optical element includes plural second prisms.

* * * * *